(12) United States Patent
Cui et al.

(10) Patent No.: US 9,438,121 B2
(45) Date of Patent: Sep. 6, 2016

(54) POWER CONVERTER FOR REDUCING STANDBY POWER CONSUMPTION

(71) Applicant: MagnaChip Semiconductor, Ltd., Cheongju-si (KR)

(72) Inventors: Zhi Yuan Cui, Cheongju-si (KR); Young Gi Ryu, Cheongju-si (KR); James Jung, Cheongju-si (KR); Hae Wook Kim, Cheongju-si (KR); Julie Jang, Cheongju-si (KR)

(73) Assignee: Magnachip Semiconductor, Ltd., Cheongju-si (KR)

( * ) Notice: Subject to any disclaimer, the term of this patent is extended or adjusted under 35 U.S.C. 154(b) by 177 days.

(21) Appl. No.: 14/258,296

(22) Filed: Apr. 22, 2014

(65) Prior Publication Data

US 2015/0003122 A1 Jan. 1, 2015

(30) Foreign Application Priority Data

Jun. 28, 2013 (KR) ........................ 10-2013-0075956

(51) Int. Cl.
*H02M 1/00* (2006.01)
*H02M 3/335* (2006.01)
*H02M 1/36* (2007.01)

(52) U.S. Cl.
CPC .......... *H02M 3/33507* (2013.01); *H02M 1/36* (2013.01); *H02M 2001/0006* (2013.01); *H02M 2001/0032* (2013.01); *Y02B 70/16* (2013.01)

(58) Field of Classification Search
CPC ............ H02M 2001/0006; H02M 2001/0032; H02M 1/32; H02M 1/34; H02M 1/36
USPC .................... 363/21.12, 21.18; 323/321, 351
See application file for complete search history.

(56) References Cited

U.S. PATENT DOCUMENTS

| | | | |
|---|---|---|---|
| 5,880,942 A * | 3/1999 | Leu | H02M 1/36 363/131 |
| 7,952,895 B2 | 5/2011 | Matthews | |
| 2011/0012554 A1* | 1/2011 | Lin | H02J 7/0052 320/107 |
| 2013/0129373 A1* | 5/2013 | Inukai | H02M 1/32 399/88 |
| 2013/0250627 A1* | 9/2013 | Herfurth | H02M 3/3376 363/21.15 |

* cited by examiner

Primary Examiner — Jessica Han
Assistant Examiner — David A. Singh

(57) ABSTRACT

A power converter according to examples reduces standby power consumption. The power converter includes a rectifier configured to rectify AC power into DC power, a transformer configured to output power by converting a voltage of DC power rectified by the rectifier, a PWM control module configured to control an output power by switching a power switching device connected to the transformer, a first external switch configured to provide a disable signal, a first capacitor that is connected in parallel to one side of the first external switch, a second external switch configured to provide an enable signal, and a second capacitor that is connected in parallel to one side of the second external switch.

20 Claims, 4 Drawing Sheets

POWER CONVERTER FOR REDUCING STANDBY POWER CONSUMPTION

CROSS-REFERENCE TO RELATED APPLICATIONS

This application claims the benefit under 35 U.S.C. §119 (a) of Korean Patent Application No. 10-2013-0075956 filed on Jun. 28, 2013, in the Korean Intellectual Property Office, the entire disclosure of which is incorporated herein by reference for all purposes.

BACKGROUND

1. Field

The following description relates to a power converter. The following description also relates to a power converter for reducing standby power consumption by consuming a driving current that is as small as possible when not actively operating in order to reduce overall power consumption.

2. Description of Related Art

A power converter denotes a device that converts and then supplies power for driving various electronic devices, such as a computer or a TV. Speaking broadly, devices such as a transformer, a rotary converter, a mercury rectifier, and other similar devices are types of power converters. However, recently, the power converter refers to a semiconductor power converter using semiconductor hardware to act as a power converter.

For example, a power converter may convert alternating current into direct current by Pulse Width Modulation (PWM) control.

FIG. 1 is a block diagram illustrating a power converter by PWM control.

The power converter illustrated in FIG. 1, a power converter by PWM control applied for Liquid-Crystal Display (LCD) TVs, is structured to achieve high speed while minimizing power consumption.

To this end, the power converter includes, as illustrated in FIG. 1, a bridge rectifier 10 that rectifies AC into DC, a Power Factor Correction (PFC) 20 reducing a ripple of input power, a PWM controller 30 converting power, a main board 40 supplied with the converted power, and common Light-Emitting Diode (LED) driver 50 and LCD module 60.

The power converter configured in this way has a power-down mode, also referred to as a disable mode that consumes a minimized driving current when the main circuit does not operate.

Such a power converter uses a large-capacity capacitor to supply appropriate power to the main circuit, and such a capacitor completely discharges the charged voltage of the capacitor in order to enter an enable state from the disable mode. Hence, the response time is long and excessive stress on the device is generated in a switching device for controlling such a large-capacity capacitor.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a power converter includes a rectifier configured to rectify AC power into DC power, a transformer configured to output power by converting a voltage of DC power rectified by the rectifier, a Pulse Width Modulation (PWM) control module configured to control an output power by switching a power switching device connected to the transformer, a first external switch configured to provide a disable signal, with one side of the first external switch connected to a VCC pin of the PWM control module and the other side of the first external switch connected to a DIS pin of the PWM control module, a first capacitor that is connected in parallel to one side of the first external switch, a second external switch configured to provide an enable signal, with one side of the second external switch connected to a DIS pin of the PWM control module and the other side of the second external switch connected to the ground, and a second capacitor that is connected in parallel to one side of the second external switch.

In response to the first external switch being turned on, the VCC pin and the DIS pin of the PWM control module may short and a signal over a threshold may be applied to the DIS pin, and the power converter is configured to operate in a disable mode.

In response to the second external switch being turned on, the DIS pin of the PWM control module may be grounded and a signal less than the threshold may be applied to the DIS pin, and the power converter is configured to operate in an enable mode.

The second capacitor may be smaller in capacity than the first capacitor.

The PWM control module may include a first internal switch that is connected between a first power device connected to an HV pin and the VCC pin, a first controller that is configured to turn off the first internal switch when the voltage of the VCC pin is a predetermined value or more, and is configured to supply HV voltage to the VCC pin by turning on the first internal switch when the voltage of the VCC pin is less than the reference value, a disable regulator that is configured to regulate the voltage of the VCC pin and the voltage of the DIS pin at a predetermined voltage or less, a first comparator that is configured to compare the voltage of the DIS pin with a first reference value, a second comparator that is configured to compare the voltage of the DIS pin with a second reference value, a second internal switch that is connected between the VCC pin and the first comparator, and a second controller that is configured to operate the first comparator by turning on the second internal switch and configured to control the operation of the disable regulator and the second comparator in accordance with the comparison result of the first comparator.

The second controller may be configured to operate the disable regulator and the second comparator, in response to the voltage of the DIS pin compared by the first comparator being the first reference value or more.

The second controller may be configured to stop the operation of the disable regulator and configured to control the mode to return to the enable mode and operate normally, in response to the voltage of the DIS pin compared by the second comparator being less than the second reference value.

The disable regulator may include a power source connected in series to the first power device, a second power device connected in parallel to the power source, and a zener diode connected in series to the power source, thereby forming a low power consumption circuit.

The first power device may be a Junction Gate Field Effect Transistor (JFET), a Depletion Metal Oxide Silicon Field Effect Transistor (MOSFET), a laterally diffused MOSFET (LDMOSFET), or a Double-Diffused MOSFET (DMOSFET).

The second power device may be a Metal Oxide Silicon Field Effect Transistor (MOSFET) or Bipolar Junction Transistor (BJT).

The PWM control module may be a monolithic integrated circuit.

The power switching device may be a Metal Oxide Silicon Field Effect Transistor (MOSFET).

The power converter may be configured to control output voltage, using pulse width modulation.

In another general aspect, a power converter includes a Pulse Width Modulation (PWM) control module configured to control an output power by switching a power switching device connected to a transformer, a first external switch configured to provide a disable signal, with one side of the first external switch connected to a VCC pin of the PWM control module and the other side of the first external switch connected to a DIS pin of the PWM control module, a first capacitor that is connected in parallel to one side of the first external switch, a second external switch configured to provide an enable signal, with one side of the second external switch connected to a DIS pin of the PWM control module and the other side of the second external switch connected to the ground, and a second capacitor that is connected in parallel to one side of the second external switch.

The power converter may further include a rectifier configured to rectify AC power into DC power, wherein the transformer is configured to output power by converting a voltage of DC power rectified by the rectifier.

In response to the first external switch being turned on, the VCC pin and the DIS pin of the PWM control module may short and a signal over a threshold may be applied to the DIS pin, and the power converter is configured to operate in a disable mode.

In response to the second external switch being turned on, the DIS pin of the PWM control module may be grounded and a signal less than the threshold may be applied to the DIS pin, and the power converter is configured to operate in an enable mode.

The second capacitor may be smaller in capacity than the first capacitor.

The PWM control module may include a first internal switch that is connected between a first power device connected to an HV pin and the VCC pin, a first controller that is configured to turn off the first internal switch when the voltage of the VCC pin is a predetermined value or more, and is configured to supply HV voltage to the VCC pin by turning on the first internal switch when the voltage of the VCC pin is less than the reference value, a disable regulator that is configured to regulate the voltage of the VCC pin and the voltage of the DIS pin at a predetermined voltage or less, a first comparator that is configured to compare the voltage of the DIS pin with a first reference value, a second comparator that is configured to compare the voltage of the DIS pin with a second reference value, a second internal switch that is connected between the VCC pin and the first comparator, and a second controller that is configured to operate the first comparator by turning on the second internal switch and configured to control the operation of the disable regulator and the second comparator in accordance with the comparison result of the first comparator.

The power converter may be configured to control output voltage, using pulse width modulation.

Other features and aspects will be apparent from the following detailed description, the drawings, and the claims.

Figure 1:
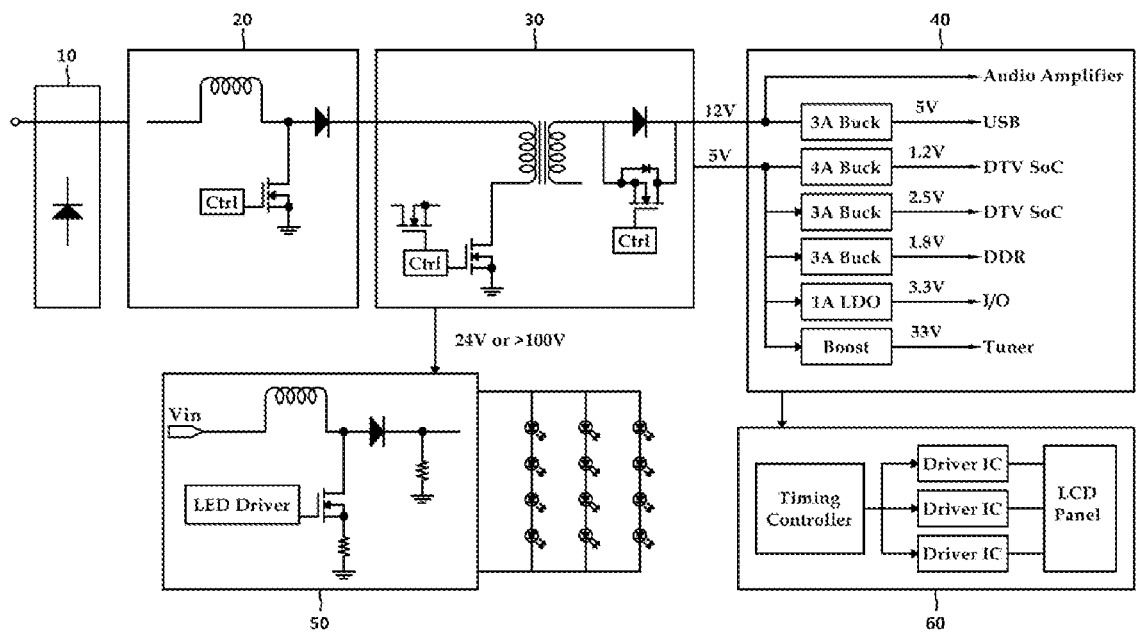
FIG. 1 is a block diagram illustrating a power converter by PWM control.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, various examples will be described with reference to the accompanying drawings.

Figure 2:
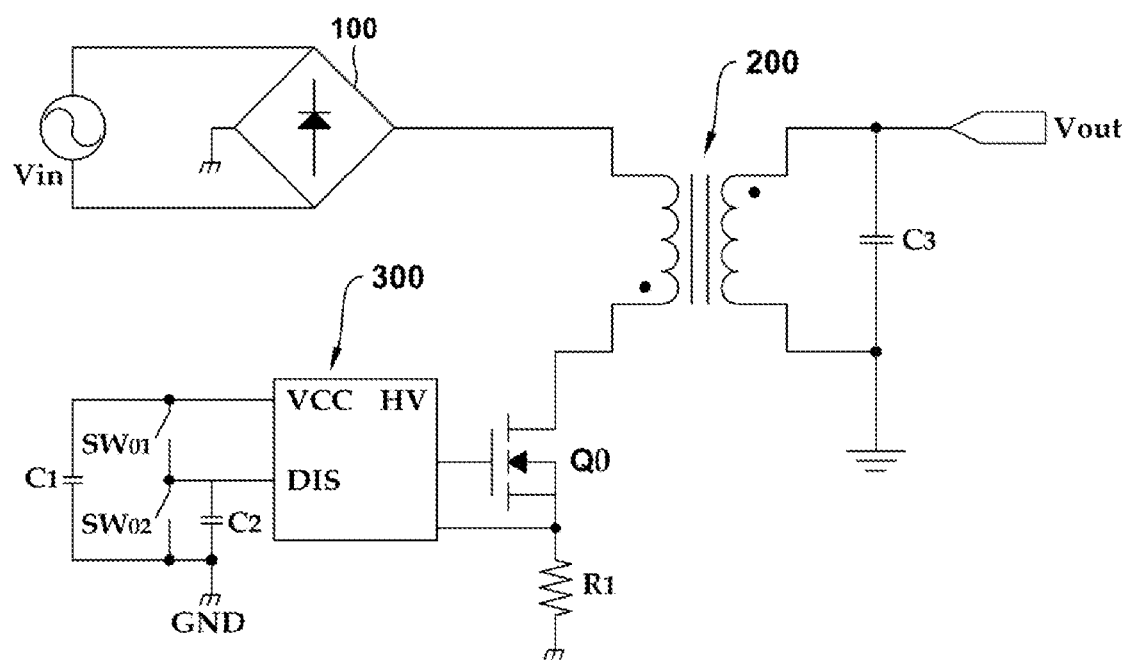
FIG. 2 is a block diagram illustrating a power converter for reducing standby power consumption according to an example.

FIG. 2 is a block diagram illustrating a power converter for reducing standby power consumption according to an example.

As illustrated in FIG. 2, a power converter for reducing standby power consumption according to an example includes several elements. The power converter of FIG. 2 includes a rectifier 100 that rectifies AC power into DC power. A transformer 200 supplies output power by converting the voltage of the DC power rectified by the rectifier 100. A PWM control module 300 controls the output power by switching a power switching device (Q0) that is connector connected to the transformer 200. A first external switch (SW01) provides a disable signal, with one side connected to a VCC pin (VCC) of the PWM control module 300 and the other side connected to a DIS pin (DIS) of the PWM control module 300. A first capacitor (C1) is connected in parallel to one side of the first external switch (SW01). A second external switch (SW02) provides an enable signal, with one side connected to a DIS pin (DIS) of the PWM control module 300 and the other side connected to a ground (GND). A second capacitor (C2) is connected in parallel to one side of the second external switch (SW02).

As used herein, first external switch (SW01) and second external switch (SW02) are referred to as external switches because they are located in the power converter and are external to the PWM control module 300. The first internal switch (SW11) and the second internal switch (SW12) are referred to as internal switches because they are located internally in the PWM control module 300.

In examples, a half-wave rectifier circuit or full-wave rectifier circuit is used for the rectifier 100 that rectifies AC voltage of an input terminal ($V_{IN}$) into DC voltage. Accordingly, the DC voltage rectified by the rectifier 100 is half-wave rectified voltage or full-wave rectified voltage, depending on the type of the rectifier 100 included in the power converter.

The PWM control module 300 is connected to the power switching device (Q0) connected to a primary wiring of the transformer 200. In an example, the power switching device (Q0) is a MOSFET (Metal Oxide Silicon Field Effect Transistor).

In an example, the rectifier 100 is connected to the primary side of the transformer 200 and the loads of a main board 40, an LED driver 50, and an LCD module 60 are connected to a secondary output terminal ($V_{OUT}$) of the transformer 200.

For example, the PWM control module 300 is manufactured into a monolithic integrated circuit and may form the entirety or a portion of the integrated circuit.

The PWM control module 300 controls the power transmitted from the input terminal ($V_{IN}$) of the power converter to the load connected to the output terminal ($V_{OUT}$) through the transformer 200. That is, the PWM control module 300 controls the voltage at the output terminal ($V_{OUT}$) of the power converter by switching the power switching device (Q0) in response to a feedback signal in PWM operation. When the power switching device (Q0) is turned on, energy is stored in the primary winding of the transformer 200 from the input terminal ($V_{IN}$). However, when the power switching device (Q0) is turned off, the energy stored in the primary winding of the transformer 200 is transmitted to the second winding and the controlled power is supplied to the load connected to the output terminal ($V_{OUT}$). Through this process, the transformer 200 controls the magnitude of the output voltage ($V_{OUT}$) by controlling an input/output winding ratio at the transformer 200.

In the operation of the PWM control module 300 for reducing standby power consumption according to an example, first, when the first external switch (SW01) is turned on, the VCC pin (VCC) and the DIS pin (DIS) of the PWM control module 300 short and a signal over a threshold is applied to the DIS pin (DIS). As a result, the power converter operates in a disable mode. In the disable mode, the main circuit does not operate. Therefore, the driving current consumed is minimized, thereby reducing standby power.

Furthermore, when the second external switch (SW02) is turned on, the DIS pin (DIS) of the PWM control module 300 is grounded and a signal less than the threshold is applied to the DIS pin (DIS). As a result, the power converter operates in an enable mode. In the enable mode, the main circuit is supplied with normal power, and operates normally.

In an example, it second capacitor (C2) has a smaller capacity than the first capacitor (C1). Using the second capacitor (C2) with a smaller capacity decreases the time for discharging the charged voltage of the capacitor for entering the enable state from the disable mode. Thus, using such a smaller capacitor helps to achieve a short response time and also helps to reduce the stress generated in the power switching device.

In an example the power converter of the present invention is able to control output voltage, using pulse width modulation techniques.

Figure 3:
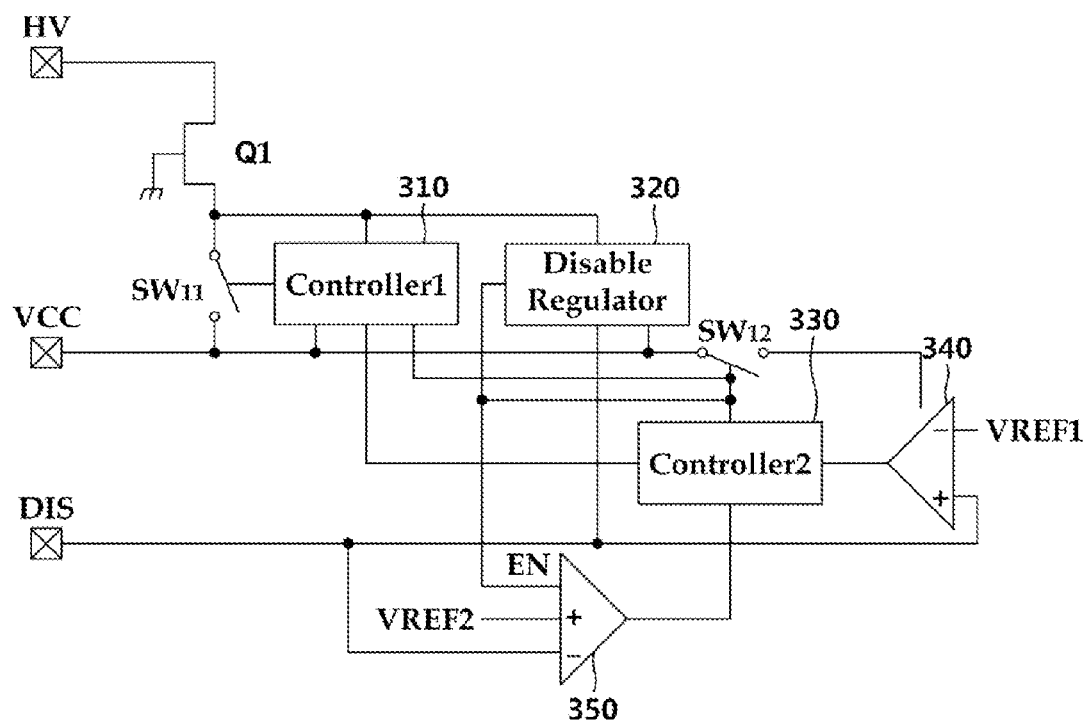
FIG. 3 is a block diagram illustrating in more detail the PWM control module of the example illustrated in FIG. 2.
Figure 4:
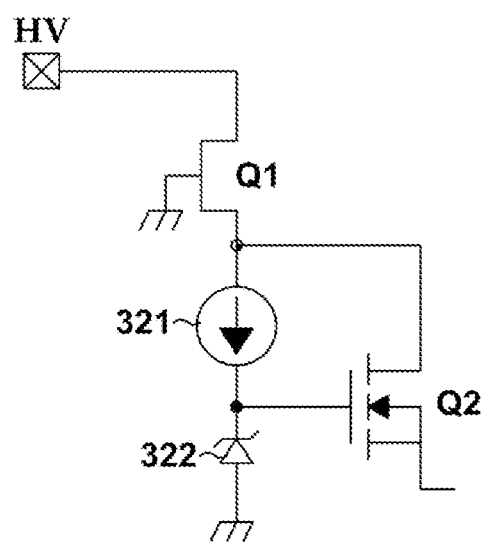
FIG. 4 is a block diagram illustrating in more detail the disable regulator illustrated in FIG. 3.

FIG. 3 is a block diagram illustrating in more detail the PWM control module of the example illustrated in FIG. 2 and FIG. 4 is a block diagram illustrating in more detail the disable regulator illustrated in FIG. 3.

As illustrated in the figures, the PWM control module 300 of the power converter for reducing standby power consumption according to an example includes several elements, as follows. A first internal switch (SW11) is connected between a first power device (Q1) connected to an HV pin (HV) and the VCC pin (VCC). A first controller 310 turns off the first internal switch (SW11) when the voltage of the VCC pin (VCC) is at or greater than predetermined value, and supplies HV voltage to the VCC pin (VCC) by turning on the first internal switch (SW11) when it is less than the reference value. A disable regulator 320 regulates the voltage of the VCC pin (VCC) and the voltage of the DIS pin (DIS) at a predetermined voltage or less. A first comparator 340 compares the voltage of the DIS pin (DIS) with a first reference value (VREF1). A second comparator 350 compares the voltage of the DIS pin (DIS) with a second reference value (VREF2). A second internal switch (SW12) is connected between the VCC pin (VCC) and the first comparator 340. A second controller 330 operates the first comparator 340 by turning on the second internal switch (SW12) and controls the operation of the disable regulator 320 and the second comparator 350 in accordance with the comparison result of the first comparator 340.

The second controller 330 operates the disable regulator 320 and the second comparator 350, when the voltage of the DIS pin (DIS) compared by the first comparator 340 is the first reference value (VREF1) or more.

Alternatively, the second controller 330 stops the operation of the disable regulator 320 and controls the disable regulator 320 to return it to the enable mode and normally operate, when the voltage of the DIS pin (DIS) compared by the second comparator 350 is less than the second reference value (VREF2).

As illustrated in FIG. 4, the disable regulator 320 includes several elements, as follows. A power source 321 is connected in series to the first power device (Q1), a second power device (Q2) is connected in parallel to the power source 321, and a Zener diode 322 is connected in series to the power source 321, thereby forming a low power consumption circuit as illustrated in FIG. 4. In FIG. 4 the Zener diode 322 is a diode that allows current to flow in the forward direction in the same manner as an ideal diode, but also permits it to flow in the reverse direction when the voltage is above a certain value, known as the breakdown voltage.

In examples, the first power device (Q1) is a Junction gate Field Effect Transistor (JFET), a Depletion Metal Oxide Silicon Field Effect Transistor (MOSFET), a Laterally Diffused MOSFET (LDMOSFET), or a Double-Diffused MOSFET (DMOSFET) and the second power device Q1 is a MOSFET or a Bipolar Junction Transistor (BJT).

In an example, the PWM control module is a monolithic integrated circuit.

The power converter for reducing standby power of the examples is potentially usable for various types of power supply devices, for example a switching mode power supply (SMPS). For example, types of power supply devices that may use the examples include a flyback type, a forward type, an LLC type, or a Cuk type. Here, an LLC type power supply is referred to as LLC because it includes two inductors (LL) and a capacitor and is a type of resonant half-bridge converter.

Therefore, according to the power converter for reducing standby power consumption of examples, it is possible to achieve a short response time for entering to an enable mode from a disable mode while also minimizing power consumption, by using the operation of a plurality of switching devices and a small-capacity capacitor presented as example. Thus, it is possible to reduce stress that is generated in the switching devices during the enable mode operation.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such as parallel processors.

As a non-exhaustive illustration only, a terminal/device/unit described herein may refer to mobile devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a high definition television (HDTV), an optical disc player, a DVD player, a Blu-ray player, a setup box, or any other device capable of wireless communication or network communication consistent with that disclosed herein. In a non-exhaustive example, the wearable device may be self-mountable on the body of the user, such as, for example, the glasses or the bracelet. In another non-exhaustive example, the wearable device may be mounted on the body of the user through an attaching device, such as, for example, attaching a smart phone or a tablet to the arm of a user using an armband, or hanging the wearable device around the neck of a user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A power converter, comprising:
   a rectifier configured to rectify AC power into DC power;
   a transformer configured to output power by converting a voltage of DC power rectified by the rectifier;
   a Pulse Width Modulation (PWM) control module configured to control an output power by switching a power switching device connected to the transformer;
   a first external switch configured to provide a disable signal, with one side of the first external switch connected to a VCC pin of the PWM control module and the other side of the first external switch connected to a DIS pin of the PWM control module;
   a first capacitor that is connected in parallel to the one side of the first external switch and to a ground; a second external switch configured to provide an enable signal, with one side of the second external switch connected to the DIS pin of the PWM control module and the other side of the second external switch connected to the ground; and a second capacitor that is connected in parallel to the one side of the second external switch and to the ground.

2. The power converter of claim 1, wherein in response to the first external switch being turned on, the VCC pin and the DIS pin of the PWM control module short and a signal over a threshold is applied to the DIS pin, and the power converter is configured to operate in a disable mode.

3. The power converter of claim 1, wherein in response to the second external switch being turned on, the DIS pin of the PWM control module is grounded and a signal less than a threshold is applied to the DIS pin, and the power converter is configured to operate in an enable mode.

4. The power converter of claim 1, wherein the second capacitor is smaller in capacity than the first capacitor.

5. The power converter of claim 1, wherein the PWM control module comprises:
   a first internal switch that is connected between a first power device connected to an HV pin and the VCC pin;
   a first controller that is configured to turn off the first internal switch when the voltage of the VCC pin is a predetermined value or more, and is configured to supply HV voltage to the VCC pin by turning on the first internal switch when the voltage of the VCC pin is less than the predetermined value;
   a disable regulator that is configured to regulate the voltage of the VCC pin and the voltage of the DIS pin at a predetermined voltage or less;
   a first comparator that is configured to compare the voltage of the DIS pin with a first reference value;
   a second comparator that is configured to compare the voltage of the DIS pin with a second reference value;
   a second internal switch that is connected between the VCC pin and the first comparator; and
   a second controller that is configured to operate the first comparator by turning on the second internal switch and configured to control the operation of the disable regulator and the second comparator in accordance with the comparison result of the first comparator.

6. The power converter of claim 5, wherein the second controller is configured to operate the disable regulator and the second comparator, in response to the voltage of the DIS pin compared by the first comparator being the first reference value or more.

7. The power converter of claim 5, wherein the second controller is configured to stop the operation of the disable regulator and configured to control the disable regulator to return to an enable mode and operate normally, in response to the voltage of the DIS pin compared by the second comparator being less than the second reference value.

8. The power converter of claim 5, wherein the disable regulator comprises:
   a power source connected in series to the first power device;
   a second power device connected in parallel to the power source; and
   a zener diode connected in series to the power source, thereby forming a low power consumption circuit.

9. The power converter of claim 8, wherein the second power device is a Metal Oxide Silicon Field Effect Transistor (MOSFET) or Bipolar Junction Transistor (BJT).

10. The power converter of claim 5, wherein the first power device is a Junction Gate Field Effect Transistor (JFET), a Depletion Metal Oxide Silicon Field Effect Transistor (MOSFET), a laterally diffused MOSFET (LDMOSFET), or a Double-Diffused MOSFET (DMOSFET).

11. The power converter of claim 1, wherein the PWM control module is a monolithic integrated circuit.

12. The power converter of claim 1, wherein the power switching device is a Metal Oxide Silicon Field Effect Transistor (MOSFET).

13. The power converter of claim 1, wherein the power converter is configured to control output voltage, using pulse width modulation.

14. A power converter, comprising:
   a Pulse Width Modulation (PWM) control module configured to control an output power by switching a power switching device connected to a transformer;
   a first external switch configured to provide a disable signal, with one side of the first external switch connected to a VCC pin of the PWM control module and the other side of the first external switch connected to a DIS pin of the PWM control module;
   a first capacitor that is connected in parallel to the one side of the first external switch and to a ground; a second external switch configured to provide an enable signal, with one side of the second external switch connected to the DIS pin of the PWM control module and the other side of the second external switch connected to the ground; and a second capacitor that is connected in parallel to the one side of the second external switch and to the ground.

15. The power converter of claim 14, further comprising a rectifier configured to rectify AC power into DC power, wherein the transformer is configured to output power by converting a voltage of DC power rectified by the rectifier.

16. The power converter of claim 14, wherein in response to the first external switch being turned on, the VCC pin and the DIS pin of the PWM control module short and a signal over a threshold is applied to the DIS pin, and the power converter is configured to operate in a disable mode.

17. The power converter of claim 14, wherein in response to the second external switch being turned on, the DIS pin of the PWM control module is grounded and a signal less than a threshold is applied to the DIS pin, and the power converter is configured to operate in an enable mode.

18. The power converter of claim 14, wherein the second capacitor is smaller in capacity than the first capacitor.

19. The power converter of claim 14, wherein the PWM control module comprises:
   a first internal switch that is connected between a first power device connected to an HV pin and the VCC pin;
   a first controller that is configured to turn off the first internal switch when the voltage of the VCC pin is a predetermined value or more, and is configured to supply HV voltage to the VCC pin by turning on the first internal switch when the voltage of the VCC pin is less than the predetermined value;
   a disable regulator that is configured to regulate the voltage of the VCC pin and the voltage of the DIS pin at a predetermined voltage or less;
   a first comparator that is configured to compare the voltage of the DIS pin with a first reference value;
   a second comparator that is configured to compare the voltage of the DIS pin with a second reference value;
   a second internal switch that is connected between the VCC pin and the first comparator; and
   a second controller that is configured to operate the first comparator by turning on the second internal switch and configured to control the operation of the disable regulator and the second comparator in accordance with the comparison result of the first comparator.

20. The power converter of claim 14, wherein the power converter is configured to control output voltage, using pulse width modulation.

* * * * *